C. H. & H. R. LOUGHRIDGE.
PIPE CUTTER.
APPLICATION FILED NOV. 4, 1915.

1,244,874.

Patented Oct. 30, 1917.
4 SHEETS—SHEET 1.

WITNESSES

INVENTORS

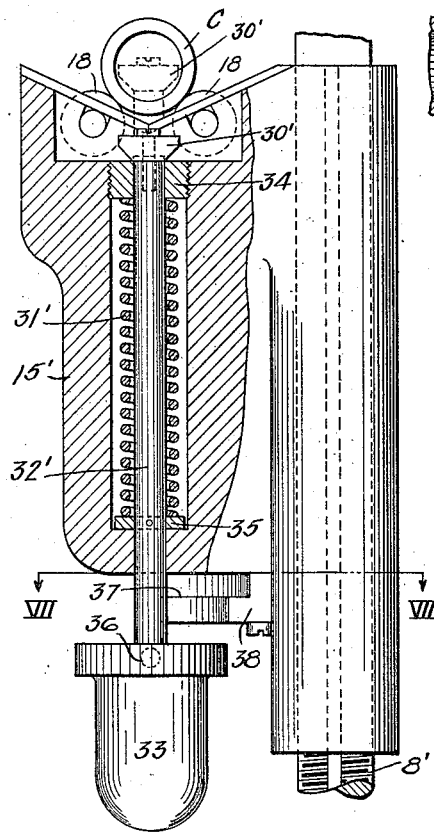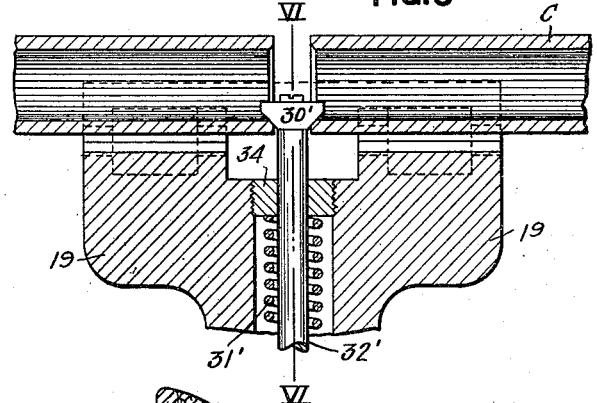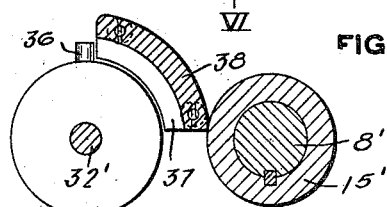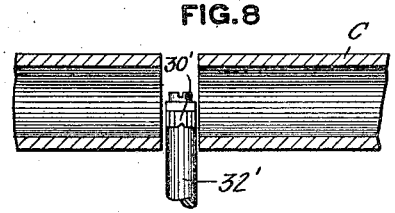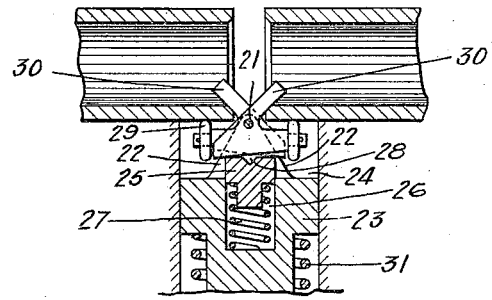

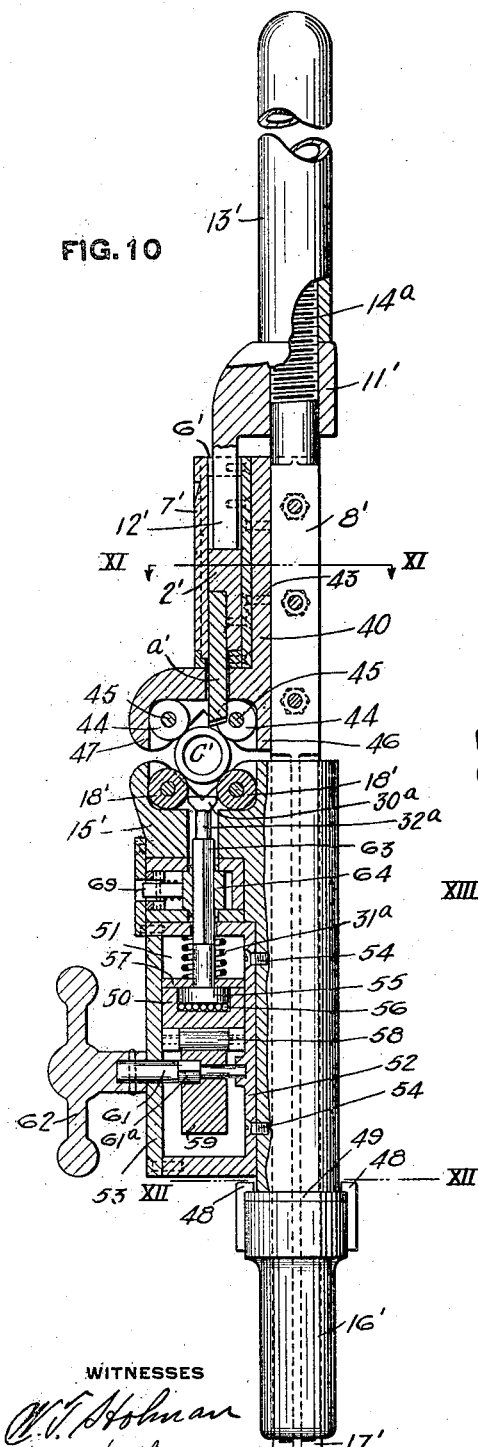

C. H. & H. R. LOUGHRIDGE.
PIPE CUTTER.
APPLICATION FILED NOV. 4, 1915.

1,244,874.

Patented Oct. 30, 1917.
4 SHEETS—SHEET 4.

WITNESSES

INVENTORS

UNITED STATES PATENT OFFICE.

CLYDE H. LOUGHRIDGE AND HOWARD R. LOUGHRIDGE, OF PITTSBURGH, PENNSYLVANIA.

PIPE-CUTTER.

1,244,874.      Specification of Letters Patent.      Patented Oct. 30, 1917.

Application filed November 4, 1915. Serial No. 59,547.

*To all whom it may concern:*

Be it known that we, CLYDE H. LOUGHRIDGE and HOWARD R. LOUGHRIDGE, citizens of the United States, residing at Pittsburgh, in the county of Allegheny and State of Pennsylvania, have invented certain new and useful Improvements in Pipe-Cutters, of which the following is a specification.

Our invention relates to improvements in pipe cutters, and has for its object to provide a device of this type adapted to cut a pipe in two, and also simultaneously to cut an angular groove in each end portion of the severed pipe sections.

The device also has in view to provide means for finishing the edges of the pipe, and is constructed and adapted to operate in the manner more fully hereinafter described.

Certain preferred embodiments of the invention are shown in the accompanying drawings, in which—

Fig. 3 is an enlarged sectional detail view showing the reaming cutters in operative position.

Fig. 4 is a detail plan view of the reaming cutters.

Fig. 5 is a sectional detail view showing a modified construction of the reaming cutter in operative position with relation to the severed pipe ends.

Fig. 6 is a sectional detail view at right angles to Fig. 5, indicated by the line VI. VI. of Fig. 5.

Fig. 7 is a cross sectional detail view, indicated by the line VII. VII. of Fig. 6.

Fig. 8 is a sectional detail view showing the modified form of reamer in a position indicated in dotted lines, Fig. 6.

Figs. 9 and 10 are views similar to Figs. 1 and 2, showing a modified construction.

Figure 2:
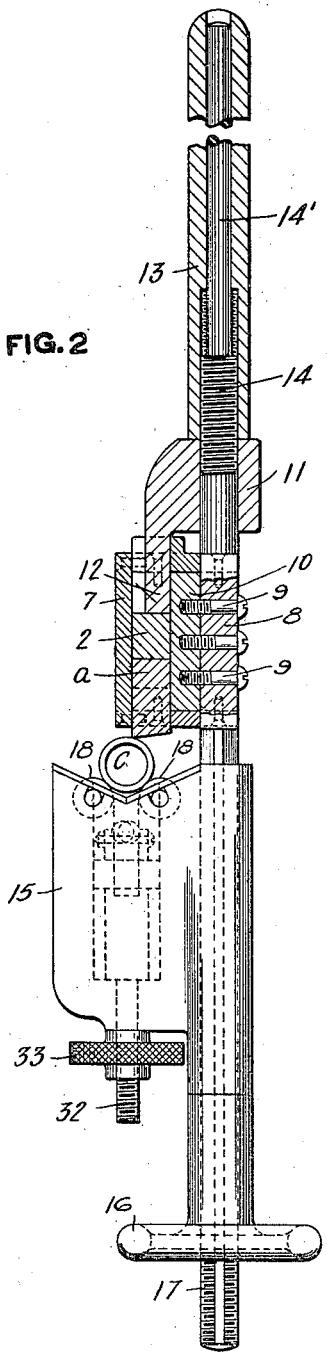
Fig. 2 is a similar view at right angles to Fig. 1.

The invention is designed to provide a pipe cutter particularly adapted to the cutting and grooving of pipes, in the improved coupling of our prior application filed Sept. 24, 1915, No. 52363. For such purpose it is provided with a plurality of cutting tools comprising a central cutter $a$ and laterally arranged grooving cutters $b$, $b$, respectively.

Said cutters are mounted in an adjustable head 2, normally retracted by springs 3 mounted between the head and a cap plate 4 of casing 5, in the interior of which head 2 is mounted. Casing 5 is provided with an opposite end plate 6 and a cover plate 7, and is itself securely mounted at its back to the main bar 8 by means of screws or bolts 9, or in any other suitable manner, whereby to make the head and cutter-carrying casing 10 a practically integral portion of said main bar 8.

Slidably mounted beyond the casing 10 is the adjustable thimble 11 having a finger 12 extending through the end wall 6 of casing 10 and bearing against the end of head 2. By adjusting the thimble 11 and finger 12 inwardly, the head 2 is actuated, compressing springs 3, and carrying the cutters $b$, $b$, inwardly toward the pipe $c$ as the cutter is rotated therearound, in the usual manner.

For the purpose of so actuating thimble 11 and its finger 12, a terminal handle 13 is threaded upon a portion 14 of the main bar 8, the handle extending therebeyond a sufficient distance and in telescoping engagement with a stem extension 14', as clearly shown, whereby to provide for operation of the machine.

At its other end portion, main bar 8 is provided with an opposing anvil member 15 slidably mounted on the bar and adjusted toward the pipe $c$ by a hand wheel 16 threaded on the threaded terminal 17 of the main bar, as will be readily understood, said bar being in splined engagement with the member 15 to maintain alinement of said parts.

Mounted in the said anvil member 15 at proper positions to engage the pipe $c$ at each side of its center, both laterally and longitudinally, are pairs of rollers 18, as commonly used in pipe cutters of the same general class, and adapted to facilitate turning of the tool around the pipe, while providing a substantial bearing and resistance against the cutters in their advancing and rotating action. Said rollers 18 are pivotally mounted by their spindles in lateral enlargements 19, 19, of the anvil member, as clearly shown in Fig. 1.

For the purpose of finishing the severed edges of the pipe, whereby to chamfer them, or to remove any adhering or projecting portions of metal, we utilize the edge cutters 20, 20, which are mounted in the central body portion of the anvil member 15, adapted to be thrust toward the severed pipe sections, and to automatically locate themselves in operative position across the inner edges of the pipe ends. Cutters 20 are each pivoted at 21 to a bolt or pin extending across from outer bearings 22, 22, of a block 23, which may be rectangular, as shown, and mounted for longitudinal movement in the interior cavity 24 of the anvil member.

Figure 1:
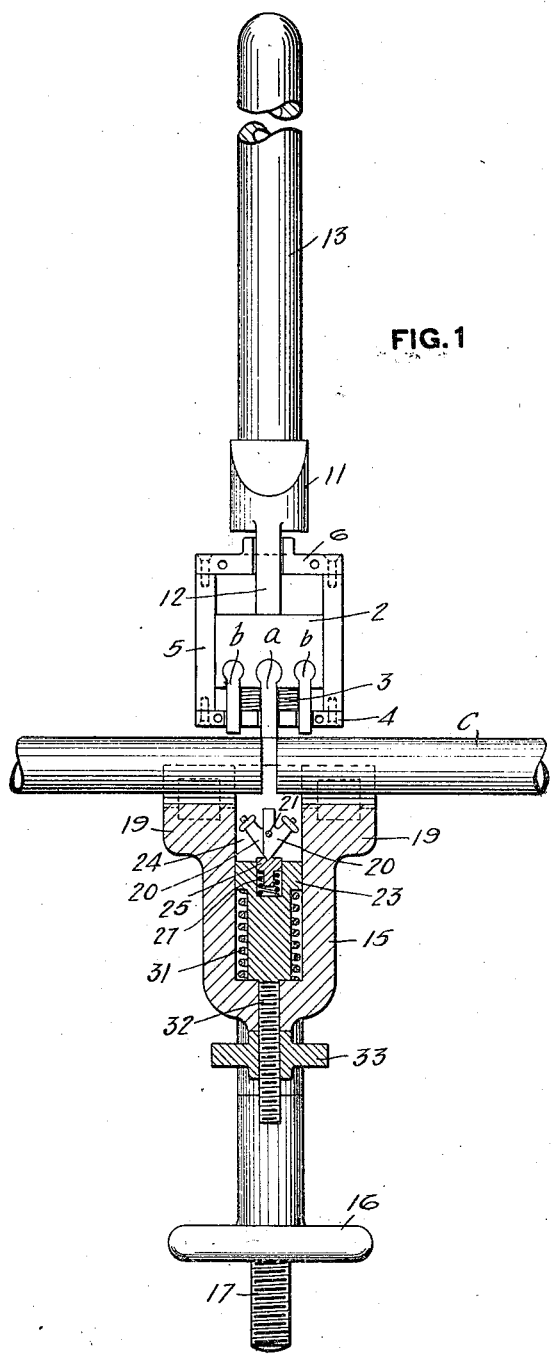
Figure 1 is a sectional face view of the device partly broken away.
Figure 11:
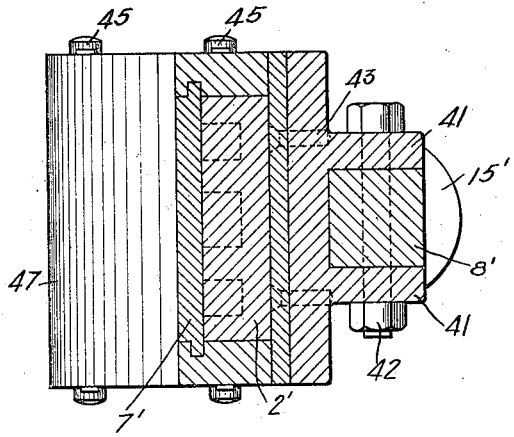
Fig. 11 is a cross sectional detail view, indicated by the line XI. XI. of Fig. 10.
Figure 12:
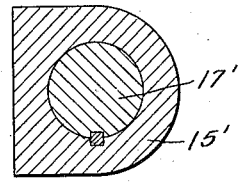
Fig. 12 is a similar sectional view, indicated by the line XII. XII. of Fig. 10.
Figure 13:
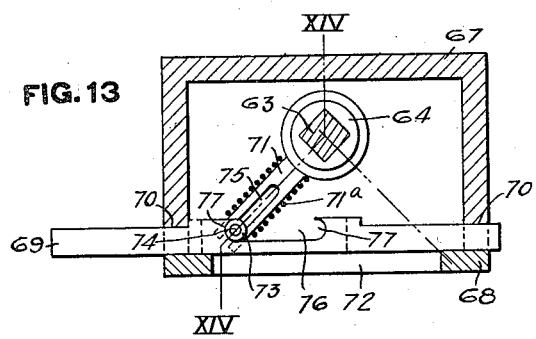
Fig. 13 is a transverse sectional view, indicated by the line XIII. XIII. of Fig. 9.
Figure 14:
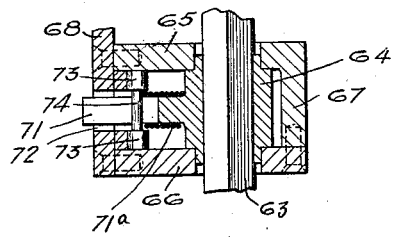
Fig. 14 is a vertical sectional detail view, indicated by the line XIV. XIV. of Fig. 13.
Figure 15:
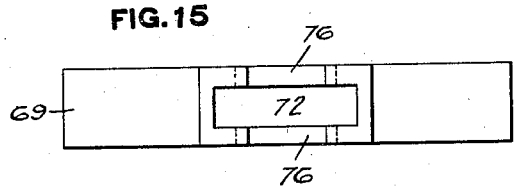
Fig. 15 is a detail face view of the shifting push bar illustrated in Figs. 13 and 14.
Figure 16:
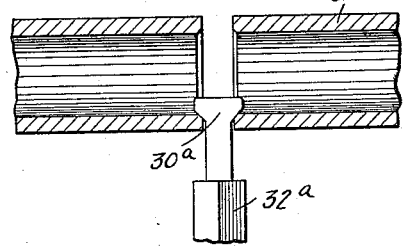
Fig. 16 is a detail sectional view, showing the reaming cutter in position, similar to Fig. 5.

Block 23 is provided with a central bearing stud 25 seated in cavity 26 of the block and normally pressed outwardly by a cushion spring 27, whereby to assist in holding the cutters in operative position, as shown in Fig. 3. Stud 25 is preferably provided with a groove 28 for reception of the corners of the cutters, as shown in Fig. 1, whereby to fixedly hold them in alinement with the cut-away space between the severed ends of the pipe to insure their insertion, and each cutter is provided, upon a laterally projected stud, with a bearing roller 29, adapted to ride against the peripheral surface of the pipe at each side and to thrust cutter arm 30 of each cutter inwardly over the inner edge of each pipe end.

Head 23 is itself adjustably mounted within the central opening 24 of the anvil member 15, or an extension thereof, and is provided with a re-acting compression spring 31 and an extended terminal 32. The latter extends through the end of the anvil member 15 and is provided with thumb nut 33, by which it is actuated to adjust the parts above described. By this means the cutters may be entirely retracted from operative position, during the ordinary cutting, and may be then advanced to finish the edges.

In Figs. 5 to 8 inclusive, we show a modified construction of reaming cutter, consisting of a single cutter head 30' mounted on the end of a longitudinally adjustable stem 32' in the anvil member 15'. Said cutter stud is sufficiently narrow to be inserted between the ends of the pipes and then turned one-quarter around and drawn back into operative position, as indicated in Figs. 6 and 5. It is provided with teeth at its cutting terminals, and when laid across the inner edges of the pipe lengthwise of their longitudinal center, and drawn against the edges, and the tool itself rotated around the pipe, it will operate to remove the rough edges or chamfer the pipe in the same general manner as above described.

A spring 31' surrounding stem 32' and bearing at one end against an inserted nut 34, and at the other end against a collar 35, acts to thrust said collar and stem 32', to which it is secured, normally away from the pipe. By this means, a constant active pressure is exerted upon the cutter 30' during its rotation within the pipe terminals. Stems 32' is provided with a terminal abutment or handle 33' having a locking pin 36. Said pin is adapted to engage beyond a ledge 37 of an annular arresting abutment 38 mounted on the main post or shank member 8', and to hold it during rotation of stem 32' to adjust the cutter to operative position.

When thus adjusted, the pin 36 will be locked beyond the other end of ledge 37 of an arresting abutment 38 mounted on the main post or shank member 8', and to hold it during rotation of stem 32' to adjust the cutter to operative position.

When thus adjusted, the pin 36 will be locked beyond the other end of ledge 37, and may be thrust by spring 31' outwardly slightly so as to bring the cutter into operative position on the pipe edges, where it will remain until its cutting operation is finished, and the cutter is again drawn outwardly from between the pipe ends and to retracted position, as shown in Fig. 6.

In the modified construction illustrated on sheets 3 and 4 of the drawings, the pipe cutter is of the same construction and mode of operation generally as above described, but the adjustable jaws are each provided with bearing rollers, and the lower jaw is provided with a modified construction of reaming cutter and adjusting mechanism therefor, the construction and mode of operation of such modified arrangement being as follows:

The several cutting tools a', b', b', respectively are mounted in the adjustable head 2' normally retracted by springs 3' mounted between the head and cap plate 4' of casing 5'. Said casing is provided with the end plate 6' and a slidably mounted cover 7' adapted to be opened or closed by movement in the receiving slideways on the inner edges of the side members of casing 5', as will be readily understood.

Casing 5' is mounted at its back on the main bar 8' by means of an intervening roller housing plate 40 having lugs 41 attached by bolts 42 to main bar 8', and thus providing a back for casing 5', which is secured by screws 43.

Bearing rollers 44 mounted on cross pins 45 at each side of the working center of the cutter head (see Fig. 10), are embraced between the back wall 46 and front wall 47 of the housing plate 40, within a suitably shaped receiving cavity therein, and so arranged as to engage the surface of the pipe at each side of its center, and with gripping relation to the similar bearing rollers of the other jaw.

The adjustable thimble 11′ having the finger 12′ extending through the end wall 6′ of the casing bears against the end of head 2′ and adjusting the cutters in the same manner as above described. Thimble 11′ is adjusted upon the threaded shank 14$^a$ by handle 13′, as already described.

At the opposite portion of the pipe gripping position, main bar 8′ is provided with an opposing jaw or anvil member 15′ slidably mounted on the bar and adjusted toward the pipe $c'$ by a rotatable handle 16′ threaded on terminal 17′ of the main bar, as will be readily understood, said bar being in splined engagement with the member 15′ to maintain alinement of said parts.

Mounted on member 15′ are rollers 18′, coacting with rollers 44, and adapted to facilitate turning of the tool around the pipe, and thus providing for non-frictional engagement therewith entirely around it. Anvil member 15′ may be accurately adjusted by handle 16′ toward the pipe, and for the purpose of positively withdrawing said member and the rollers away therefrom, the handle is provided with a pair of lateral embracing flanges 48, 48, one at each side of a terminal flange 49 at the end of the anvil member 15′, and around which the flange retaining treminals 48 positively engage.

An edge cutter head 30$^a$ mounted on the end of a longitudinally adjustable stem 32$^a$ is sufficiently narrow to be inserted between the ends of the pipes and then turned one-quarter around and drawn back into operative position, in the same manner generally as above described.

For the purpose, however, of actuating such stem and its cutter, I provide an adjustable step box 50, mounted within a suitable receiving cavity 51 within a surrounding casing 52 having a removable cover plate 53, such casing being fixedly secured to the face of the anvil member 15′ by screws 54 or other suitable means.

Stem 32$^a$ is provided with a bearing terminal 55 extending into box 50 and in rotatable engagement with a series of bearing rollers or balls 56 therein, providing for easy rotation of the spindle.

A retracting spring 31$^a$ is inserted between the inner face of the casing and a cover plate 57 of box 50, secured thereto, whereby to withdraw the stem and cutter, as indicated in Fig. 10. Box 50 is provided with a bearing roller 58, against which bears a cam 59, preferably having a recess 60 therein for locating the roller when the cam is reversed, at the lowermost position of the cutter spindle. Cam 59 is provided with an actuating key 61 extending upwardly through plate 53 and provided with a turning handle 62, the inner end of stem 61 being squared, as indicated at 61$^a$, for engagement with a squared recess in cam 59 for actuation thereof, as will be readily understood.

For the purpose of rotating the cutter 30$^a$ and its spindle when raised to operative position, between the adjacent ends of the severed pipe, stem 32$^a$ is provided with a squared shank portion 63 which passes centrally through actuating hub 64, which is mounted between the sides 65, 66, of a receiving box 67, which itself is held in fixed relation to the anvil member 15′ by suitable securing means.

A cover plate 68 of box 67 provides an outer bearing for a sliding bar 69, which in turn is seated in slideway sockets 70, 70, at each end of casing 67, and adapted to be thrust to one side or the other to actuate the hub 64. Said hub is provided with an arm 71 extending through opening 72 of bar 69 and carrying rollers 73, 73, on pin 74, which in turn passes transversely and is movable longitudinally through slot 75.

Spring 71$^a$ surrounding arm 71 bears against stem 14 and operates to throw the arm 71 beyond the dead center, when thrust to one side or the other, and to complete the remainder of the movement through an arc of 90°, whereby to turn stem 32$^a$ to a corresponding one-quarter revolution. Hub 64 engaging squared shank 63 slidably will actuate it at whatever position it may be when raised or lowered by cam 59, and the desired rotation of the shank carrying the cutter 30$^a$ is thus accomplished by push bar 69. Said bar is provided with a clearance space 76 at each side of opening 72, in each end of which space is a concave bearing 77 providing a seat for the roller at either end of the movement.

What we claim is:

1. In a pipe cutter, the combination with a main stem, of an anvil member adjustably mounted thereon having bearing rollers, a relatively movable cutter head having a plurality of cutters of different lengths, a carrying block therefor mounted on the stem, and a handle in threaded engagement with the main stem having a coacting portion adapted to adjust the cutter head toward the work.

2. In a pipe cutter, the combination with a main stem, of an anvil member adjustably mounted thereon having bearing rollers, a relatively movable cutter head having a plurality of cutters of different lengths, a carrying block therefor mounted on the stem, retracting springs between the carrying block and the cutter head, and an adjustable handle having a finger engaging the cutter block.

3. In a cutter of the class described, the combination of a main shank, an adjustable anvil member thereon having bearing rollers and provided with a separately adjustable reaming device, and an oppositely acting cutter head provided with a movable cutter.

4. In a cutter of the class described, the combination of a main shank, an adjustable anvil member thereon having bearing rollers and provided with a separately adjustable reaming device, and an oppositely acting cutter head provided with a series of cutters and retracting spring mechanism.

5. In combination, a main supporting shank, an anvil member carried thereby, and an adjustable cutter head having a central cutter and a supplemental cutter at each side thereof terminating backwardly of the cutting plane of the central cutter.

In testimony whereof we hereunto affix our signatures in the presence of two witnesses.

CLYDE H. LOUGHRIDGE.
HOWARD R. LOUGHRIDGE.

Witnesses:
W. A. HECKMAN,
C. M. CLARKE.

Copies of this patent may be obtained for five cents each, by addressing the "Commissioner of Patents, Washington, D. C."